United States Patent
Tessiereau et al.

(10) Patent No.: US 11,649,769 B2
(45) Date of Patent: May 16, 2023

(54) AIRTIGHT SEAL FOR BLEED VALVE DOOR OF A TURBOMACHINE

(71) Applicant: SAFRAN AIRCRAFT ENGINES, Paris (FR)

(72) Inventors: Antonin Etienne Diego Tessiereau, Moissy-Cramayel (FR); Florent Robert André Godin, Moissy-Cramayel (FR); Bruno Alexandre Didier Jacon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 108 days.

(21) Appl. No.: 17/296,840

(22) PCT Filed: Nov. 29, 2019

(86) PCT No.: PCT/FR2019/052839
§ 371 (c)(1),
(2) Date: May 25, 2021

(87) PCT Pub. No.: WO2020/109738
PCT Pub. Date: Jun. 4, 2020

(65) Prior Publication Data
US 2022/0003168 A1    Jan. 6, 2022

(30) Foreign Application Priority Data
Nov. 29, 2018 (FR) ........................................ 1872063

(51) Int. Cl.
*F02C 7/28*    (2006.01)
*F01D 25/28*    (2006.01)
*F16J 15/02*    (2006.01)

(52) U.S. Cl.
CPC ................ *F02C 7/28* (2013.01); *F01D 25/28* (2013.01); *F16J 15/02* (2013.01); *F05D 2220/32* (2013.01); *F05D 2240/55* (2013.01)

(58) Field of Classification Search
CPC ........ F01D 11/00; F01D 17/14; F01D 17/141; F01D 17/145; F01D 25/00; F04D 29/682;
(Continued)

(56) References Cited

U.S. PATENT DOCUMENTS 8,152,137 B2 * 4/2012 Comin .................. F04D 27/023
251/301
2016/0194971 A1 7/2016 Yagi

FOREIGN PATENT DOCUMENTS

CA    2 696 837 A1    5/2009
FR    2796439 A1 *    1/2001 ............. F16J 15/025
(Continued)

OTHER PUBLICATIONS

Translation of FR2796439, retrieved Mar. 18, 2022. (Year: 2022).*
International Search Report as issued in International Patent Application No. PCT/FR2019/052839, dated Feb. 7, 2020.

*Primary Examiner* — Topaz L. Elliott
*Assistant Examiner* — Cameron A Corday
(74) *Attorney, Agent, or Firm* — Pillsbury Winthrop Shaw Pittman LLP

(57) ABSTRACT

An airtight seal configured to be mounted on a first turbomachine member, such as a door of a bleed valve, and to bear against a second member of the turbomachine, such as a hub of an intermediate casing, the airtight seal including a retaining device for mounting the seal on the first member; a sealing lip ensuring airtightness through contact and intended to bear against the second member; an anti-return device for the sealing lip reinforcing the rigidity of the airtight seal at the base of the sealing lip.

12 Claims, 3 Drawing Sheets

(58) Field of Classification Search
CPC .... F04D 29/684; F04D 29/083; F04D 27/009; F04D 27/025; F16J 15/02; F16J 15/025
See application file for complete search history.

(56) References Cited

FOREIGN PATENT DOCUMENTS

| | | |
|---|---|---|
| FR | 2 923 541 A1 | 5/2009 |
| FR | 2 939 835 A1 | 6/2010 |

* cited by examiner

AIRTIGHT SEAL FOR BLEED VALVE DOOR OF A TURBOMACHINE

CROSS-REFERENCE TO RELATED APPLICATIONS

This application is the U.S. National Stage of PCT/FR2019/052839, filed Nov. 29, 2019, which in turn claims priority to French patent application number 1872063 filed Nov. 29, 2018. The content of these applications are incorporated herein by reference in their entireties.

TECHNICAL FIELD OF THE INVENTION

The field of the invention is that of bleed valves for turbomachine casings, and notably for turbomachine intermediate casings.

The invention more specifically relates to an airtight seal for a bleed valve door of a turbomachine, and to a bleed valve of a turbomachine comprising such an airtight seal.

PRIOR ART

Bleed valves, also known by their acronym VBV for Variable Bleed Valves, are generally mounted on the hub of an intermediate casing of a double flow turbomachine, positioned between the low pressure compressor and the high pressure compressor. The bleed valves are positioned in an annular inter-flow path space of the hub of the intermediate casing extending between a primary flow path (primary path) in which a primary air stream circulates and a secondary flow path (secondary path) in which a secondary air stream circulates.

These bleed valves are regularly spread out on the hub of the intermediate casing around the longitudinal axis of the turbomachine and each comprises a door pivotably mounted around an axis, so as to be angularly displaceable with respect to the intermediate casing, between a sealed off position in which the door seals off an airway orifice arranged in the hub of the intermediate casing and an open position of this orifice.

The bleed valves thus ensure airtightness between the primary flow path and the secondary flow path in their sealed off position and enable the evacuation of a part of the primary air stream outside of the primary flow path under certain operating conditions in their open position. The part of the primary air stream extracted is either reinjected into the secondary air stream, or used to supply cooling systems or to ventilate components of the turbomachine.

To ensure airtightness between the primary flow path and the secondary flow path, the bleed valve doors have an airtight seal, for example made of elastomer, extending onto the perimeter of the peripheral edges of each door. The airtight seal is intended to bear, in the closed position of the bleed valve, against the wall of the intermediate casing edging the airway orifice.

Different types of seal as well as different techniques for fastening the airtight seal onto the perimeter of bleed valve doors are known.

The document FR2923541 describes an exemplary embodiment of an airtight seal, according to the prior art. The airtight seal comprises a flat part extending onto the outer face of the peripheral parts of the door, which is maintained tightened on this door by a fastening plate, and a bulging part forming a bead (or instead a strip) and which extends around the peripheral edges of the door so as to bear on the perimeter of the airway orifice of the intermediate casing when the bleed valve is in its closed position.

However, in certain situations and conditions of use, and notably when the pressure of the primary air stream is important (for example above a pressure of 2 bars), the levels of leaks observed in sealed off position with this type of bead seal, or strip seal, are too important and difficult to accept.

Consequently, to overcome this drawback and to improve the airtightness efficiency of a bleed valve in these particular situations, bleed valves provided with a lip seal mounted on the perimeter of the doors of the bleed valves have been developed, airtightness being ensured by the lip of the seal bearing on the perimeter of the airway orifice of the intermediate casing.

Due to its relative flexibility, this type of seal has the advantage of achieving good airtightness during the first closing of the door and during pressurisation of the primary flow path. This type of seal also makes it possible not to require a too important contact force, thus avoiding an important loading of hydraulic jacks and mechanisms for controlling the closing of the bleed system.

However, it has been noted that the lip of the airtight seal had a tendency to return to the opening position, notably under the effect of the bleed flow between the primary flow path and the secondary flow path. This turning round of the lip has for consequence an incorrect repositioning thereof when the door is closed, and notably as soon as a second opening/closing kinematic takes place. The lip thus turned round does not return to the original position and no longer ensures satisfactory airtightness, causing leakages, in closed position, which may be problematic, because they cause overconsumption or a reduction in the performances of the turbomachine.

In addition, it has been noted that the use of this type of lip seal makes the control of the opening of the bleed valve difficult. Indeed, this type of lip seal causes an instantaneous and important bleed between the moment when the lip of the seal is still in contact with the wall of the intermediate casing (leakage rate equal to zero) and the moment when there is no longer contact between the lip and the wall of the intermediate casing (primary flow path bleed). In addition, this type of lip seal causes a dead zone. This dead zone results from zero bleed flow while the angular modification of the bleed valve is taking place, compromising the correct operation of the turbomachine, to end up with the sudden bleed of air when the lip can no longer ensure the function of airtightness.

Consequently, this type of lip seal does not make it possible to achieve fine control of bleed valves.

DESCRIPTION OF THE INVENTION

In this context, the invention aims to propose a solution enabling these drawbacks to be resolved.

To this end, the invention relates to an airtight seal configured to be mounted on a first turbomachine member, such as a door of a bleed valve, and to bear against a second member of the turbomachine, such as an intermediate casing hub, said airtight seal being characterised in that it comprises:
  retaining means for mounting said seal on said first member;
  a sealing lip ensuring airtightness through contact and intended to bear against said second member;
  anti-return means for said sealing lip reinforcing the rigidity of the airtight seal at the base of the sealing lip.

The airtight seal according to the invention may also have one or more of the characteristics below, considered individually or according to all technically possible combinations thereof:
- the seal comprises a hinge having a curved portion positioned between the retaining means and the anti-return means, said curved portion being configured to deform and modify the relative position of the anti-return means when the airtight seal is subjected to air pressure;
- the curved portion has a general C shape;
- the anti-return means form a stop to limit the elastic deformation of the curved portion of the hinge when the airtight seal is subjected to air pressure in order to increase the contact and thus the airtightness;
- the anti-return means are formed by a bead of material;
- the retaining means for mounting said seal on said first member have a general U shape;
- the retaining means for mounting said seal on said first member comprise reinforcement fibres coated with an elastomeric material and silicone; the reinforcement fibres are for example made of glass or polyester,
- the sealing lip is covered with an antifriction fabric, preferentially made of polyester or meta-aramid.

The subject matter of the invention is also a turbomachine bleed valve door comprising a peripheral edge, characterised in that it comprises an airtight seal mounted on said peripheral edge via the retaining means.

The subject matter of the invention is also a turbomachine bleed valve comprising a door according to the invention mounted pivoting around an axis of rotation between a sealed off position of an airway orifice and an open position of this orifice.

The subject matter of the invention is also an intermediate casing comprising a plurality of bleed valves according to the invention ensuring airtightness at the level of a plurality of airway orifices.

Advantageously, the intermediate casing comprises a bleed valve control mechanism.

The subject matter of the invention is also a turbomachine comprising a low pressure compressor, a high pressure compressor and an intermediate casing according to the invention positioned longitudinally between the low pressure compressor and the high pressure compressor.

The invention and the different applications thereof will be better understood on reading the description that follows and by examining the figures that accompany it.

BRIEF DESCRIPTION OF THE FIGURES

Other characteristics and advantages of the invention will become clear from the description that follows, with reference to the appended figures, which illustrate.

For greater clarity, identical or similar elements are marked by identical reference signs in all of the figures.

Detailed Description of an Embodiment

Figure 1:
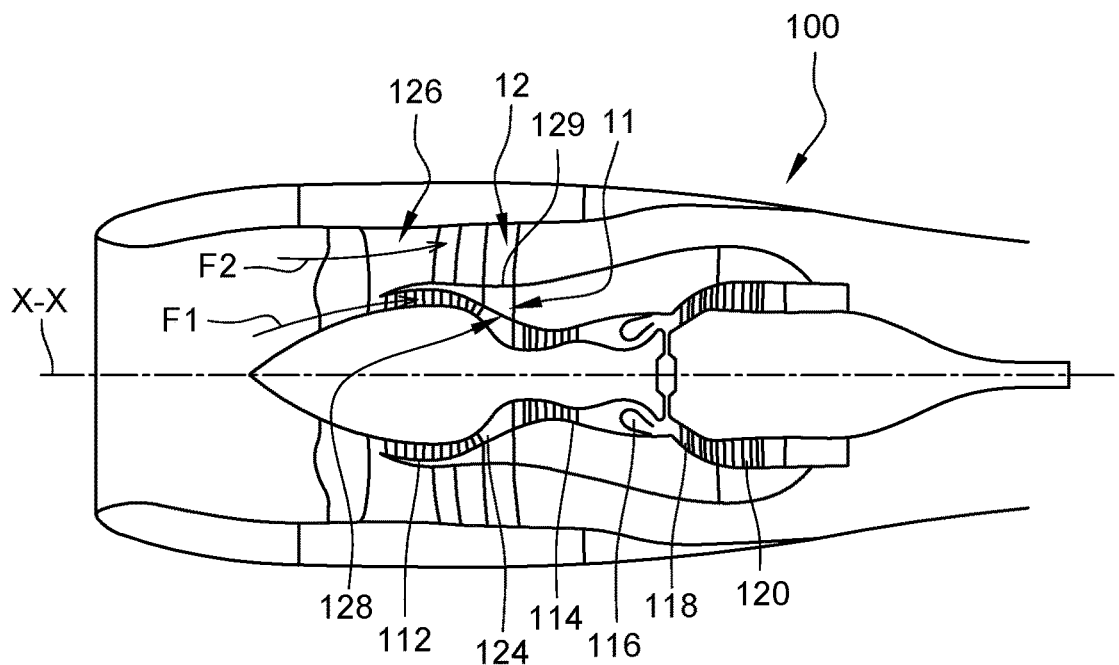
FIG. 1 schematically illustrates, in axial section, a double flow turbomachine according to the invention.

FIG. 1 schematically illustrates, in axial section, a double flow turbomachine.

Such a turbomachine 100 comprises, from upstream to downstream along the direction of flow of gases, a low pressure compressor 112, a high pressure compressor 114, a combustion chamber 116, a high pressure turbine 118 and a low pressure turbine 120. The high pressure turbine 118 is integral with the high pressure compressor 114 so as to form a high pressure body, whereas the low pressure turbine 120 is integral with the low pressure compressor 112 so as to form a low pressure body, such that each turbine rotationally drives the associated compressor around the axis X-X of the turbomachine 100 under the effect of the thrust of the gases coming from the combustion chamber 116.

In such a turbomachine 100, an intermediate casing 12 is interposed between the low pressure compressor 112, situated upstream, and the high pressure compressor 114, situated downstream.

Figure 2:
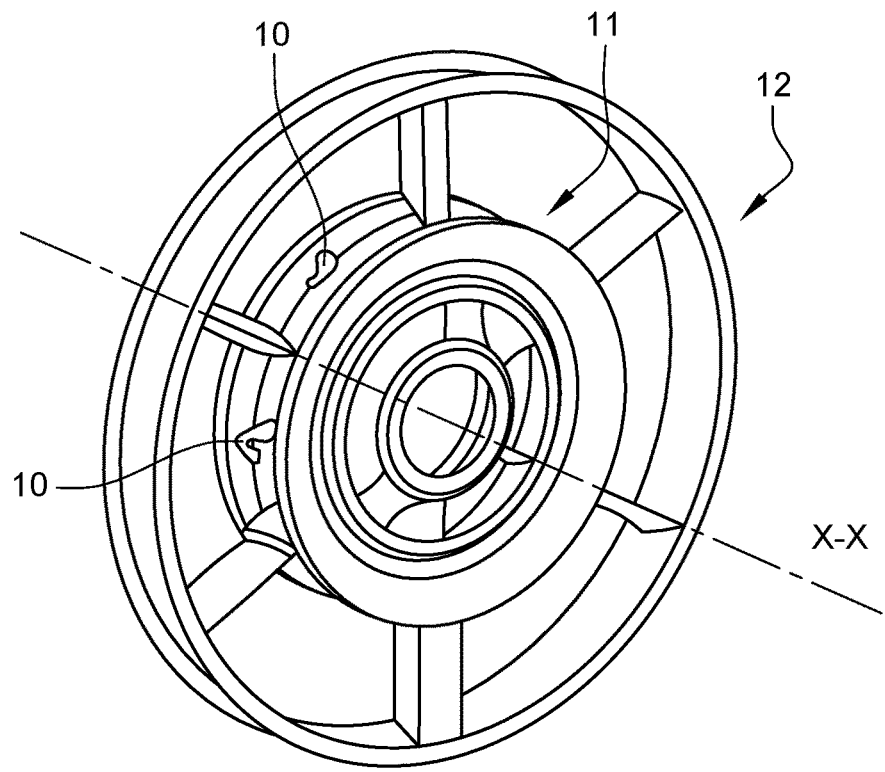
FIG. 2 is a simplified view of a turbomachine intermediate casing having bleed valves according to the invention.

FIG. 2 represents a simplified view of an intermediate casing 12 on which bleed valves 10 are mounted at the level of the hub 11 of the intermediate casing 12.

The intermediate casing 12 has a general cylindrical or truncated shape. The hub 11 comprises two coaxial annular shells, respectively inner 128 and outer 129; mutually connected by an upstream transversal flange and by a downstream transversal flange. The upstream flange is arranged downstream of the low pressure compressor 112 whereas the downstream flange is arranged upstream of the high pressure compressor 114. The high pressure compressor 114 generally comprises a succession of variable pitch rotors and stators, making it possible to control the flow rate of air passing therethrough.

The inner annular shell 128 delimits the outer part with respect to the axis X-X of the primary flow space, or primary flow path 124, of the primary stream F1 of the turbomachine and comprises bleed air inlet orifices 14 spread out circumferentially around an axis of revolution of the intermediate casing 12, this axis being merged with the axis X-X of rotation of the turbomachine.

Each of these bleed air inlet orifices 14, of substantially parallelepiped shape, is associated with a bleed valve 10 intended for the regulation of the flow rate of the high pressure compressor 114. The outer annular shell 129 delimits, for its part, the inner part with respect to the axis X-X of the secondary flow space, secondary flow path 126, of the secondary stream F2, and comprises air outlet orifices arranged downstream of the downstream transversal flange and spread out circumferentially around the axis X-X.

The hub 11 of the intermediate casing 12 comprises for example twelve inlet orifices 14 regularly spread out around the longitudinal axis of the turbomachine X-X, and in a complementary manner twelve bleed valves 10.

Figure 3:
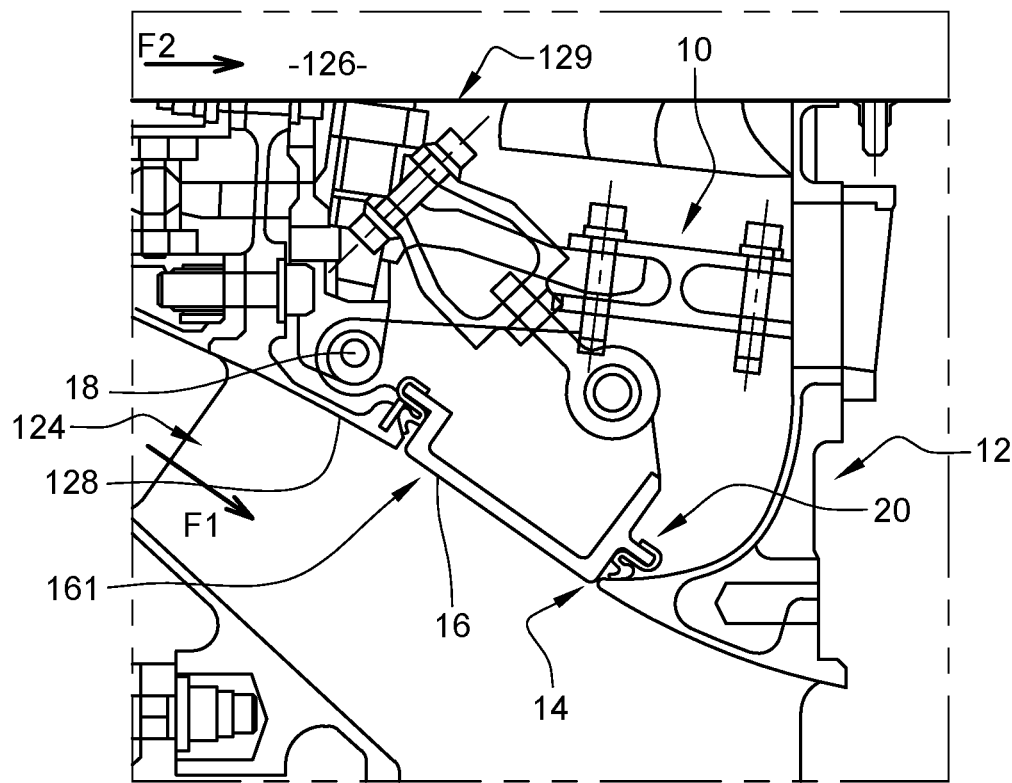
FIG. 3 is a schematic sectional view of a portion of a turbomachine bleed valve comprising an airtight seal according to the invention.

FIG. 3 represents in a more precise manner a portion of a bleed valve 10 of an intermediate casing 12 of a turbomachine 100 according to the invention.

Each bleed valve 10 of the intermediate casing 12 comprises a door 16 which has a substantially parallelepiped shape complementary to that of the corresponding bleed air inlet orifice 14. The function of the door 16 is to ensure airtightness between the primary stream F1 and the secondary stream F2 and to allow a bleed flow between the primary stream F1 and the secondary stream F2 as a function of a programme for controlling the bleed valve 10.

The door 16 is for example manufactured by injection of suitable plastic material, such as for example a thermoplastic material of PEEK (poly ether ether ketone) or ULMET® (poly ether imide) type. The material of the door 16 may also be reinforced with fibres, such as glass fibres.

The bleed valve 10 also comprises pivoting means 18 to make the door 16 pivot around a transversal axis which is substantially tangential to the intermediate casing 12 and which extends substantially along the peripheral edge upstream of the door 16.

The door 16 is thus angularly moveable by pivoting around the transversal axis between a closed position, in which the inner surface 161 of the door 16 is aligned with the surface of the inner annular shell 128 of the intermediate casing 12, and an open position of this orifice 14 in which the door 16 is inclined according to an angle of around 60° towards the inside of the cavity of the hub 11 of the intermediate casing 12 with respect to its closed position.

So as to ensure airtightness of the primary flow path 124 in the closed position of the bleed valve 10, said bleed valve comprises an airtight seal 20 extending along the peripheral edges 162 (lateral, upstream and downstream) of the door 16.

Figure 4:
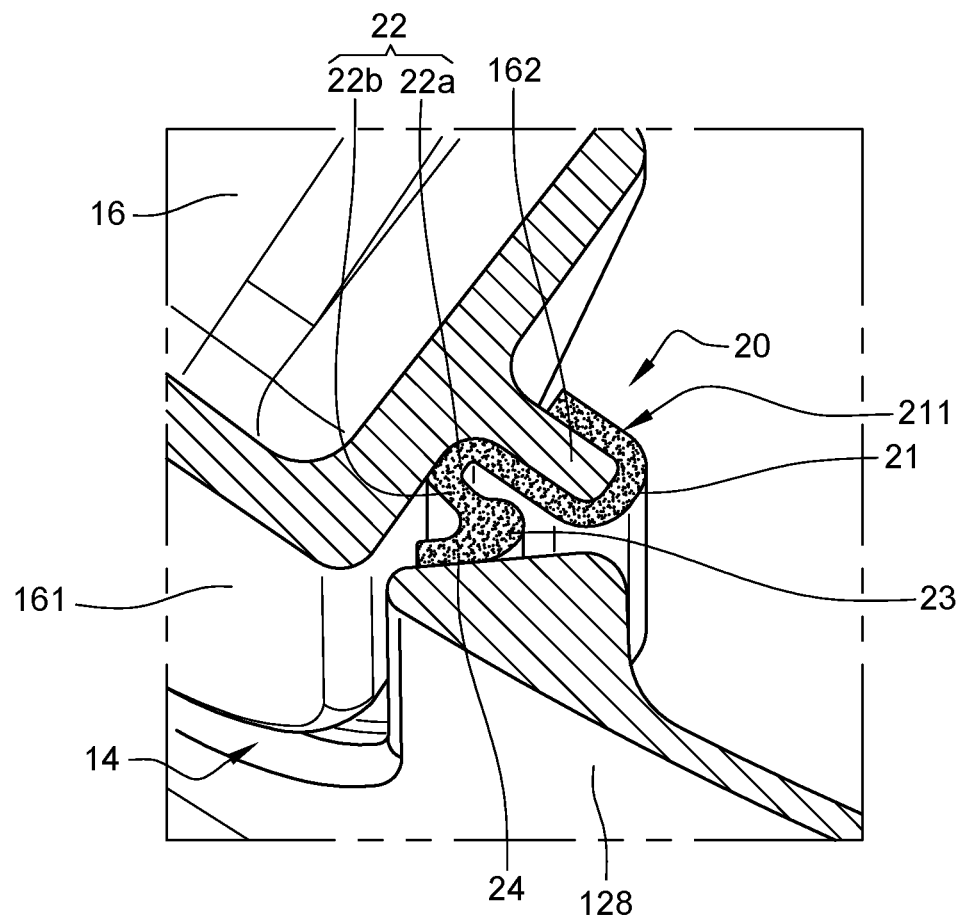
FIG. 4 is a simplified sectional view of a portion of a turbomachine bleed valve illustrating the behaviour of the airtight seal according to the invention in closed position.

An exemplary embodiment of an airtight seal 20 mounted on a door 16 of a bleed valve 10 is represented partially in sectional view in FIG. 4.

FIG. 4 is a simplified sectional view of a portion of a turbomachine bleed valve illustrating the behaviour of the airtight seal according to the invention in closed position.

The airtight seal 20 comprises a first part 21 having a shape configured to enable interlocking around the peripheral edges 162 of the door 16. The first part 21 thus forms the means for retaining the airtight seal 20 enabling it to be maintained on the door 16.

The first part 21 has for example a general U shape. This first U shaped part 21 is intended to interlock around the peripheral edges 162 of the door 16 and form the means for retaining the airtight seal 20 on the door 16. The airtight seal 20 is thus maintained on the door 16 by interlocking then optionally bonding the first U shaped part 21 onto the peripheral edges 162 of the door 16.

Advantageously, the airtight seal 20 is bonded onto the peripheral edges 162 of the door 16, via this first U shaped part 21.

In the continuity of this first U shaped part 21 (i.e. going towards the primary flow path), the airtight seal 20 comprises a zone of material forming a hinge 22, also having a general C shape, of which the direction of curvature is reversed with respect to the first part 21, such that these two parts 21, 22 combined have a general reversed S shape.

The hinge 22 comprises, in the continuity of the first U shaped part 21, a first curved portion 22a forming a return and a second portion 22b substantially rectilinear and oriented substantially parallel to the outer surface 211 of the airtight seal 20 (at least in its nominal position, i.e. without pressurisation of the primary flow path 124). The first curved portion 22a forms a pivot point for the airtight seal 20 configured to deform during pressurisation of the primary flow path 124.

In the continuity of the hinge 22, the airtight seal 20 comprises a sealing lip 24, having smaller dimensions than the hinge 22. The sealing lip 24 is a flexible lip intended to come into contact with the inner wall of the inner annular shell 128 of the intermediate casing 12 so as to ensure airtightness between the primary flow path 124 and the secondary flow path 126.

At the base of the sealing lip 24, i.e. opposite its free end, the airtight seal 20 comprises an "anti-return" means for the sealing lip 24 configured to reinforce the structure of the seal 20 at the level of the base of the sealing lip 24.

According to an exemplary embodiment, the anti-return means are formed by a curved portion 23 having a general C shape or V shape (the inside of the curve being directed towards the pressurised air flow coming from the primary flow path 124) of which the thickness is greater than the remainder of the airtight seal 20 thus forming a reinforced zone less flexible than the hinge 22 and the sealing lip 24. This curved portion 23 is positioned between the hinge 22 and the sealing lip 24.

This curved and thick portion 23, which will be designated by the term heel in the remainder of the description, forms a swelling, or a bead, between the hinge 22 and the sealing lip 24 of the airtight seal 20. The aim of the heel 23 is to stiffen the base of the sealing lip 24 (which is of relatively flexible nature) so as to prevent its turning round in operation.

The heel 23 also makes it possible, thanks to its increased thickness, to form a support, or a stop, limiting deformation of the airtight seal 20 under the effect of pressure, notably at the level of the hinge 22.

These two functions are enabled notably by the C shape of the heel as well as by the increased thickness of material at the level of this portion.

The heel 23 has the advantage of "curbing" the general flexibility of the airtight seal 20, and notably the sealing lip 24. Thus, the airtight seal 20 has sufficient flexibility at the level of the sealing lip 24 guaranteeing good airtightness in severe conditions of use of a turbomachine, while ensuring sufficient rigidity at the base of the sealing lip 24 to avoid too important deformation of the airtight seal 20 under pressure as well as a turning round of the sealing lip 24 under a high bleed flow.

Figure 5:
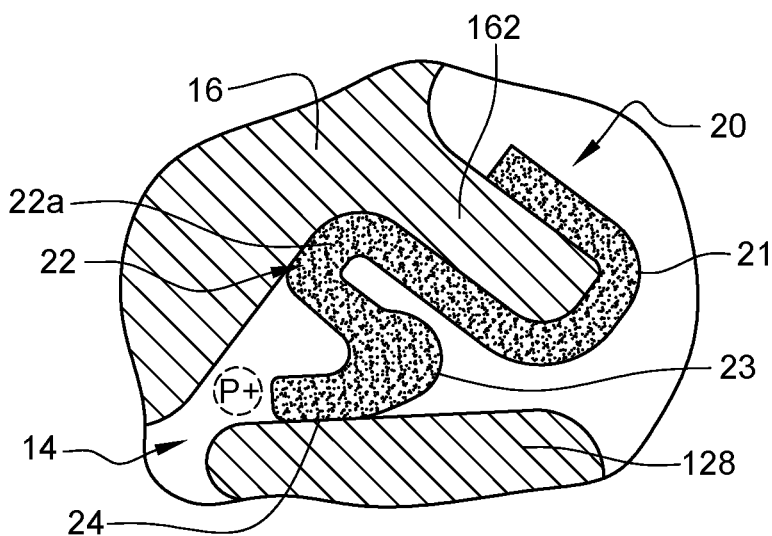
FIG. 5 is a schematic sectional view of a portion of a turbomachine bleed valve illustrating the behaviour of the airtight seal according to the invention in closed position when the primary flow path is under pressure.
Figure 6:
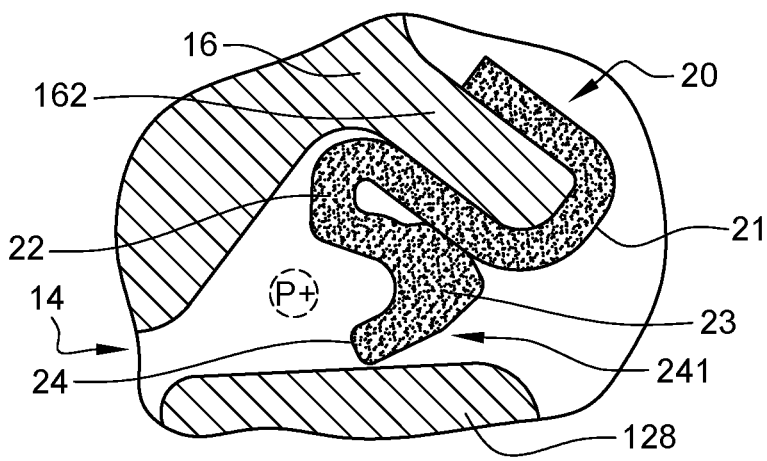
FIG. 6 is a schematic sectional view of a portion of a turbomachine bleed valve illustrating the behaviour of the airtight seal according to the invention during the start of opening of the door.
Figure 7:
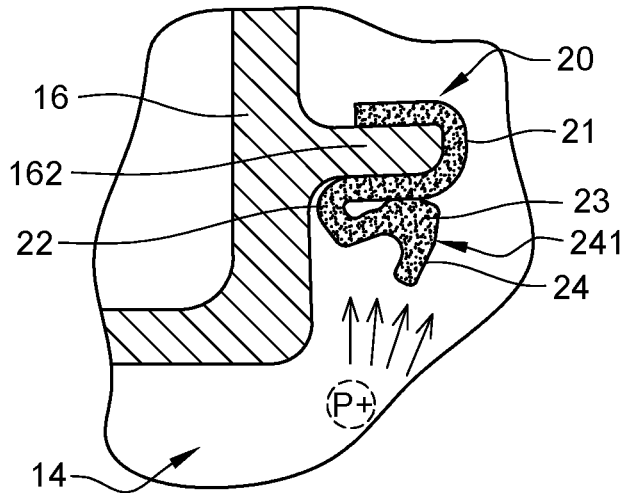
FIG. 7 is a schematic sectional view of a portion of a turbomachine bleed valve illustrating the behaviour of the airtight seal according to the invention when the door is completely open.

FIGS. 5 to 7 represent different sectional views illustrating the behaviour of the airtight seal 20 according to the invention in situation.

FIG. 5 illustrates the behaviour of the airtight seal according to the invention in closed position of the bleed air inlet orifice 14 by the door 16 when the primary flow path is under pressure.

FIG. 6 illustrates the behaviour of the airtight seal 20 according to the invention during the opening of the door 16 (and precisely at the start of opening).

FIG. 7 illustrates the behaviour of the airtight seal 20 according to the invention when the door 16 is completely open and allows part of the primary stream F1 of the primary flow path 124 to pass into the secondary stream F2 of the secondary flow path 126.

As illustrated in FIG. 5, the particular architecture of the airtight seal 20 according to the invention makes it possible to optimise contact between the sealing lip 24 and the inner annular shell 128 of the intermediate casing 12 by controlled deformation of the airtight seal 20. During differential pressurisation, illustrated by the symbol P+ in the figures, the hinge 22 deforms at the level of the pivot point of the first portion 22a. Indeed, under the effect of the greater pressure of the primary flow path 124, the first C shaped portion 22a of the hinge 22 deforms, and tightens so as to modify the position of the heel 23 with respect to its nominal position, this coming closer to the first U shaped part 21. The heel 23 thus bears on the inner portion of the first U shaped part 21, which positions the sealing lip 24 in a stable position in contact with the inner annular shell 128 of the intermediate casing 12. The increase of pressure in the primary flow path 124 even has the advantage of further pressing the sealing lip 24 against the inner annular shell 128 of the intermediate casing 12 thus increasing airtightness at the level of the orifice 14. The heel 23, which has a greater increased thickness than the leakage space between the door 16 and the inner annular shell 128 of the intermediate casing 12, thus advantageously forms a plug. The dimensions of the heel 23 are determined so as to control the deformation of the airtight seal 20 at the level of the hinge 22, and thus to guarantee the position of the sealing lip 24 in a repeatable manner to ensure optimal airtightness during pressurisation.

During opening of the door 16, as illustrated in FIG. 6, the airtight seal 20 ensures airtightness up to a certain inclination of the door 16, for example up to an inclination less than 0.5°, between its initial closed position and the start of its pivoting, by maintaining the sealing lip 24 bearing against the wall of the intermediate casing 12. The position and the shape of the sealing lip 24 are ensured during this phase by the support generated at the level of the heel 23 under the effect of the pressure difference between the enclosures. When the contact pressure generated by the sealing lip 24 becomes less than the pressure of the primary flow path, the airtight seal 20 makes it possible to achieve a progressive, and not sudden, bleed of the primary flow path as a function of the inclination of the door 16, because there is no turning round of the sealing lip 24. The adjustment of the so-called dead zone situated between the initial closed position and the start of pivoting of the door 16 is carried out by adjusting the thickness of the heel 23, and thus the position of the sealing lip 24, such that it is possible to modify the minimum angle of inclination to obtain a start of leakage flow.

In position of total opening of the door 16, as represented in FIG. 7, the heel 23 is maintained in contact against the first U shaped part 21 under the effect of the bleed flow illustrated by arrows at the level of the orifice 14. Due to the dimensions of the sealing lip 24 and the presence of the heel 23 limiting deformation of the sealing lip 24, the sealing lip 24 remains in place and does not turn round as has been able to be observed on lip seals of the prior art. Thus, the airtight seal 20 according to the invention remains intact, and airtightness is ensured during following opening/closing kinematics without loss of efficiency and without deterioration of the airtight seal 20 during different closings.

The airtight seal 20 according to the invention is made of elastomeric material, for example silicone. It may be reinforced on at least one part by fibres in its inner structure, for example glass fibres, woven or not. Advantageously, the airtight seal 20 is reinforced at the level of the first U shaped part 21. Advantageously, the airtight seal 20 is reinforced at the level of the first U shaped part 21 by a glass fibre or polyester fabric.

So as to minimise friction of the sealing lip 24 during closing and thus to avoid its degradation during different opening/closing kinematics, the sealing lip 24 has a contact surface 241 having a low coefficient of friction. Advantageously, means for minimising the coefficient of friction are applied on the surface 241 intended to be in contact with the intermediate casing 12. Advantageously, the sealing lip 24 has an antifriction fabric arranged at the level of the contact surface 241 intended to be in contact with the intermediate casing 12, such as for example an antifriction fabric made from polyester or meta-aramid fibres.

The airtight seal 20 according to the invention makes it possible to minimise the aforesaid dead zone such that an angular modification beyond 0.5° of opening of the door 16 makes it possible to modify the bleed flow of the primary flow path. Thus, the airtight seal according to the invention makes it possible to realise a fine control of the bleed valves 10.

The airtight seal 20 according to the invention also makes it possible to realise a progressive and regular bleed, which facilitates the control of the bleed valves 10.

The invention is not limited to the embodiment described previously with reference to the figures and alternatives could be envisaged without going beyond the scope of the invention.

The invention claimed is:

1. An airtight seal configured to be mounted on a first turbomachine member and to bear against a second member of the turbomachine, said airtight seal comprising:
   retaining means for mounting said seal on said first member, said retaining means having a general U shape forming a first part;
   a sealing lip ensuring airtightness through contact and intended to bear against said second member;
   anti-return means for said sealing lip reinforcing a rigidity of the airtight seal at the base of the sealing lip, and
   a hinge having a curved portion with a general C shape positioned between the retaining means and the anti-return means, the general C shape having a direction of curvature which is reversed with respect to the first part.

2. The airtight seal according to claim 1, wherein said curved portion is configured to deform and modify a relative position of the anti-return means when the airtight seal is subjected to air pressure.

3. The airtight seal according to claim 2, wherein the anti-return means form a stop to limit an elastic deformation of the curved portion of the hinge when the airtight seal is subjected to air pressure.

4. The airtight seal according to claim 2, wherein the anti-return means are formed by a bead of material.

5. The airtight seal according to claim 1, wherein the retaining means for mounting said seal on said first member comprise reinforcement fibres coated with an elastomeric material.

6. The airtight seal according to claim 1, wherein the sealing lip is covered with an antifriction fabric.

7. The airtight seal according to claim 1, wherein the first turbomachine member is a door of a bleed valve.

8. The airtight seal according to claim 1, wherein the second member of the turbomachine is a hub of an intermediate casing.

9. A door of a bleed valve comprising a peripheral edge and an airtight seal according to claim 1 mounted on said peripheral edge via the retaining means.

10. A bleed valve comprising a door according to claim 9, said door being pivoted around an axis of rotation between a position of sealing off an airway orifice and a position of opening said airway orifice.

11. An intermediate casing of a turbomachine comprising a plurality of bleed valves according to claim 10 ensuring airtightness at a plurality of airway orifices.

12. A turbomachine comprising a low pressure compressor, a high pressure compressor and an intermediate casing according to claim 11 positioned longitudinally between the low pressure compressor and the high pressure compressor.

* * * * *